(12) United States Patent
Schümann et al.

(10) Patent No.: US 6,599,624 B2
(45) Date of Patent: Jul. 29, 2003

(54) ADHESIVE TAPE WITH THERMALLY CURABLE BACKING FOR MASKING A CATHODIC ELECTROCOAT PRIMER

(75) Inventors: Uwe Schümann, Pinneberg (DE); Nicolai Böhm, Hamburg (DE); Siegfried Krupke, Tornesch (DE); Ulrike Wappler, Hamburg (DE)

(73) Assignee: tesa AG, Hamburg (DE)

( * ) Notice: Subject to any disclaimer, the term of this patent is extended or adjusted under 35 U.S.C. 154(b) by 37 days.

(21) Appl. No.: 09/736,859

(22) Filed: Dec. 14, 2000

(65) Prior Publication Data
US 2002/0114948 A1 Aug. 22, 2002

(30) Foreign Application Priority Data

Dec. 15, 1999 (DE) .......................... 199 60 467

(51) Int. Cl.$^7$ .................................. C09J 7/02
(52) U.S. Cl. ................... 428/343; 428/423.7; 428/354; 428/423.1; 428/480
(58) Field of Search ............... 428/343, 423.7, 428/354, 423.1, 480

(56) References Cited

U.S. PATENT DOCUMENTS

| | | | |
|---|---|---|---|
| 4,322,516 A | 3/1982 | Wiest et al. | 526/307.7 |
| 4,374,883 A * | 2/1983 | Winslow | 428/40 |
| 5,464,692 A | 11/1995 | Huber | 428/343 |
| 5,496,601 A | 3/1996 | Schurb | 428/40 |
| 5,824,394 A * | 10/1998 | Kinoshita et al. | 428/195 |

FOREIGN PATENT DOCUMENTS

| | | | |
|---|---|---|---|
| EP | 0 017 986 | 10/1980 | C08F/218/08 |
| EP | 0 655 989 | 6/1995 | C03C/27/04 |
| EP | 0 836 542 A2 | 3/1998 | B60J/11/00 |
| WO | WO/99/16618 | 4/1999 | B32B/27/08 |

* cited by examiner

Primary Examiner—Daniel Zirker
(74) Attorney, Agent, or Firm—Norris McLaughlin & Marcus

(57) ABSTRACT

An adhesive tape provided on one side with a self-adhesive composition and comprising a backing material comprising a polyester film coated with a crosslinked, thermally vulcanizable polyurethane.

13 Claims, No Drawings

ADHESIVE TAPE WITH THERMALLY CURABLE BACKING FOR MASKING A CATHODIC ELECTROCOAT PRIMER

DESCRIPTION

Adhesive Tape with Thermally Curable Backing for Masking a Cathodic Electrocoat Primer The invention relates to an adhesive tape, especially for masking off window flanges, preferably in automotive body shells coated with cathodic electrocoat, and to processes for producing the adhesive tape. The purpose of the adhesive tape is to protect the window flanges against overpainting during the subsequent coating and baking processes such that following the removal of the adhesive tape an automotive glass window can be installed onto the surfacer- and topcoat-free window flange using a reactive PU window adhesive.

BACKGROUND OF THE INVENTION

Automobile glass windows are conventionally mounted in the painted vehicle body using rubber seals. In recent years, this method has been increasingly replaced by the installation of the windows using reactive adhesives (based, for example, on polyurethane). The window is coated with the adhesive and placed on the body such that the adhesive bead is pressed onto the window flange.

The installed windows, especially the windshields, nowadays act as reinforcing elements of the body. In the extreme case, that of the vehicle turning over, they prevent the roof columns from buckling. Consequently, a sufficient bond strength is critical to the safety of a modern motor vehicle in an accident situation.

Modern automotive finishes comprise a variety of coats, which are applied to the primed bodywork metal in the following order (schematically):

electrophoretic coat, usually cathodic electrocoat surfacer or functional coat color coat topcoat According to Römpp Lexikon Chemie (Version 1.5, Stuttgart/New York: Georg Thieme Verlag 1998), electrophoretic coating (electrodeposition coating; electrocoating) is a technique in which coating takes place by the action of an electrical field (from 50 to 400 V). The article to be coated, which conducts electric current, is introduced into the paint bath as an anode or cathode, with the tank wall in practice acting as the second electrode.

The amount of paint deposited is directly proportional to the amount of current supplied. Electrophoretic coating is used especially for priming, in the automotive industry, for example. There are no spray losses, and the coatings obtained are highly uniform, even in difficult-to-reach areas. Where the substrates are not conductive, such as plastics, glass, ceramic, etc., coating is carried out by way of the electrostatic charging of the paint particles (known as electrostatic coating).

If the automobile window is bonded onto the painted window flange after the painting process has been completed, the following disadvantages arise.

Since the window adhesive has to be matched to the topcoat as its adhesion substrate, an unnecessarily high degree of complexity may result given the large number of topcoats used by a manufacturer, since it is necessary to hold a large number of appropriate adhesives in stock. More significant, however, is the fact that the total bond strength of the automobile window depends on the weakest point in the multicoat paint system, and may therefore be much lower than the bond strength of the adhesive to the topcoat.

It is therefore advantageous to apply the window to the bottommost paint coat, the cathodic electrocoat. The number of cathodic electrocoat preparations used by a manufacturer is usually lower than the number of topcoats. Firstly, there are few defined adhesion substrates for the window adhesive, and secondly the system comprising primed metal/cathodic electrocoat/window adhesive, with two boundary layers, harbors a lower risk of fracture than a complex overall coating system.

To mask the window flange following the application of the cathodic electrocoat it is possible to use a PVC plastisol as described in EP 0 655 989 B1. This plastisol is applied in liquid form to the window flange, painted over and gelled during the baking phase at temperatures of at least 163° C. to give a solid film. A disadvantage of this process is that for the purpose of demasking after baking has taken place it is necessary for a "grip tab" to be mechanically exposed, in which case the cathodic electrocoat may also easily be damaged, something which harbors the danger of subsequent corrosion.

On the window flanges, the plastisol strip crosses, in some cases more than once, PVC seam sealants which fill weld seams. On gelling, a frequent observation is of instances of severe sticking between seam sealants and PVC plastisol window flange masking, which prevent easy demasking. Another observation is of plastisol-related contamination of the adhesion substrate, giving rise to an adhesion failure at the boundary between window adhesive and formerly plastisol-masked cathodic electrocoat.

As a result, the required bonding security of the window is not ensured.

Although this drawback can be countered by using a primer, such a step is labor-intensive, leads to unwanted solvent emissions, and may necessitate repair to the paint, as a result of accidental splashing or dripping on the topcoat.

A more advantageous possibility for the masking of window flanges is the use of adhesive tapes. For a number of years, masking has been carried out using a PVC-polyester laminate, laminated with natural rubber adhesive and rendered self-adhesive with a natural rubber adhesive composition. Similarly to the plastisol bead, this adhesive tape is bonded to the cathodically electrocoated window flange before surfacing and coating, and following baking is removed together with the paint coats applied to it. Application may be made by hand or else, in an automated process, by robot.

The principal disadvantage of this last-mentioned product is the frequency of errors during demasking, since the laminate tends toward complete and partial splicing and also toward tearing. Partial splicing, in particular, represents a safety risk, since the polyester film which remains on the window flange is little different in color from the cathodic electrocoat and is therefore easily missed. These residues of polyester are a wholly inappropriate adhesion medium for window adhesives and, accordingly, may result in inadequate window adhesion.

A further disadvantage both of the last-mentioned product and of the PVC plastisol are the disposal difficulties. Land filling is injudicious for reasons of the biological persistence of the PVC. Recycling is not possible, owing to contamination with the various paint coats. Incineration harbors the hazard of the emission of hydrochloric acid and dioxins. To avoid this requires complex measures in the incinerators, such as flue-gas scrubbing and very high incineration temperatures, for example.

It is an object of the invention to develop an adhesive tape, especially for window flange masking, with a backing material which does not exhibit the disadvantages of the prior art, or not to the same extent. In particular, on demasking, the adhesive tape should neither tear nor undergo complete or partial splicing. Moreover, the adhesive tape should not contain PVC.

Suitable backing materials, in principle, for an adhesive tape which for this application is required to withstand typical high temperatures of up to 180° C. for approximately 30 minutes are films made of polyester (polyethylene terephthalate PET, polyethylene naphthalate PEN), and also fibrous materials such as cotton, aromatic polyamide and polyester wovens or nonwovens. A disadvantage of fiber materials is their inherent low extensibility, which makes it more difficult to stick the tape on in curves.

If the tape is to be processed by robot, it is subjected to strong tensile forces and must therefore possess a high tensile modulus in order to prevent early extension, which under the hot conditions leads to a high recovery tension.

The requirement for high tensile strength in combination with temperature resistance for a number of minutes is met by biaxially oriented PET or PEN films having a draw ratio lengthwise (MD: machine direction) to crosswise (CD: cross direction) of from about 3–4:3–4. A problem of oriented polyester films, however, is the low tear propagation resistance as soon as the film edge has suffered minimal damage. Since, when the overpainted adhesive tape is removed, the multicoat paint film is torn and always has a slightly jagged edge, when a simple polyester film is removed the adhesive tape is very frequently torn.

Moreover, simple polyester films are a poor adhesion substrate for applied paint films. The consequence is splintering of surfacer and topcoat and thus contamination of the vehicle surface, especially the window flange joint.

SUMMARY OF THE INVENTION

A polyester film coated with a crosslinked thermally vulcanizable polyurethane as backing material for an adhesive tape proves to be outstandingly suitable for solving the problems posed. The crosslinked polyurethane, through incorporation of vulcanizing assistants and vulcanization accelerators, is such that it does not vulcanize until during the application, i.e. on exposure at the application temperatures of 160° C. to 180° C., making considerable gains in strength as a result in this process.

DETAILED DESCRIPTION

In one preferred embodiment, the polyol component of the crosslinked, thermally vulcanizable polyurethane layer comprises carbon—carbon double bonds. Examples of suitable polyols include hydroxyl-functionalized polybutadienes, hydroxyl-functionalized polyisoprenes, or polyols chemically derived from or chemically related to the aforementioned products. Also suitable are polyols derived therefrom and having additional functionalization, such as epoxidized types, for example. Likewise suitable are polyether polyols and polyester polyols whose chemical backbone contains carbon—carbon double bonds.

In another preferred embodiment, the polyol component of the crosslinked, thermally vulcanizable polyurethane comprises sulfur as vulcanizing assistant and thiazoles, sulfenamides, thiurams, guanidines, dithiocarbamates, thioureas or if desired zinc oxide, individually or in combination, as vulcanization accelerators.

In one preferred embodiment, aliphatic isocyanates are used to prepare the crosslinked, thermally vulcanizable polyurethane layer. Suitable examples include isophorone diisocyanate, hexamethylene diisocyanate, dicyclohexylmethane 4,4'-diisocyanate, mixtures of the aforementioned isocyanates, or isocyanates derived from them by chemical means, for example, dimerized, trimerized or polymerized types, which may contain urea, uretdione or isocyanurate groups, for example. However, it is also possible to use aromatic isocyanates, such as tolylene diisocyanate or diphenylmethane 4,4'-diisocyanate, for example, or isocyanates which contain aromatic groups but in which the isocyanate groups themselves are aliphatically attached, an example being m-tetramethylxylene diisocyanate.

In addition to the listed isocyanate components and the polyol components which react with them, however, it is also possible to use other starting materials to form the polyurethane without departing from the concept of the invention.

In one possible embodiment the crosslinked, thermally vulcanizable polyurethane layer comprises further formulation constituents, such as fillers, plasticizers, and auxiliaries and additives, for example. Fillers which can be used include both reinforcing fillers, such as carbon black, for example, and nonreinforcing fillers, such as chalk or barium sulfate, for example. Further examples are talc, mica, silica or silicates. Mixtures of the aforementioned substances may also be used.

Examples of plasticizers are phthalic esters or alkylsulfonic ester of phenol.

To achieve freedom from bubbles, it is also possible to admix driers, such as calcium oxide or molecular-sieve zeolites, for example, to the formulation, especially in the range between 0% by weight and 10% by weight.

In order to accelerate the reaction between the isocyanate component and the isocyanate-reactive component, use may be made of any of the catalysts known to the skilled worker, such as tertiary amines or organotin compounds, for example.

In another preferred embodiment, an NCO/OH ratio of 0.8 to 1.2 for the formation of the crosslinked, thermally vulcanizable, polyurethane is set.

In one preferred embodiment, the polyester film is coated with the polyurethane by the process described below:

a) A vessel A is charged essentially with the polyol component and a vessel B essentially with the isocyanate component, the further formulating constituents having if appropriate been admixed with these components beforehand in a customary mixing process, in a preferred embodiment the vulcanization auxiliaries and vulcanization accelerators of the A component having been admixed.

b) The polyol component and the isocyanate component are mixed in a mixer of a two-component mixing and metering unit.

c) The thermally vulcanizable polyurethane composition thus mixed is applied to the polyester film which has been coated with a pressure-sensitive adhesive composition and which is preferably moving at a constant speed, the side bearing the pressure-sensitive adhesive composition having been placed on an antiadhesively treated medium, for example, release paper or release film, or an antiadhesively treated belt.

d) The assembly of thermally vulcanizable polyurethane composition, polyester film and pressure-sensitive adhesive composition is passed through a heating tunnel with a moderately set temperature profile, so that the thermally vulcanizable polyurethane composition crosslinks but does not yet vulcanize.

e) The laminate, finally, is wound up in a winding station.

In a preparation step, the polyester film is provided on one side with a pressure-sensitive adhesive composition. This is done in a customary coating process, either from a solution or from the melt.

In an alternative process, the polyester film may also be coated first with the thermally vulcanizable polyurethane and then provided with a pressure-sensitive adhesive composition.

Surprisingly, and in a manner unforeseeable to the skilled worker, the assembly of the crosslinked, thermally vulcanizable polyurethane layer and the polyester film is found after baking of the paint films to be substantially stronger and more stable than a PVC/polyester assembly, so that on demasking there is no tearing or splicing of the backing material. During the baking of the paint films, the thermal vulcanization of the polyurethane layer sets in and leads to a considerable gain in strength of the adhesive tape assembly as a whole.

It is be regarded as a further advantage that the preparation of the polyurethane/polyester assembly, unlike that of the PVC/polyester assembly, does not require a laminating adhesive. Moreover, the material may be disposed of in a very advantageous way.

Suitable self-adhesive compositions for the adhesive tape are in principle all pressure-sensitive adhesive compositions which have the required temperature stability over approximately 30 minutes at 180° C. and which at these temperatures possess a sufficiently high shear strength to withstand the shrinkage tendency of the backing material. Examples include all crosslinkable natural rubber, synthetic rubber and acrylate adhesive compositions possessing a bond strength appropriate to the application—i.e., more than 2 N/cm—on cathodic electrocoat substrates.

One advantageous embodiment of the self-adhesive composition is based on a copolymer of ethylene, vinyl acetate, acrylic ester, and, if desired, acrylamide. Such a copolymer is described in EP 0 017 986 A1.

Surprisingly, and in a manner unforeseeable for the skilled worker, synthetic rubbers of this kind, based on the monomers ethylene (E), vinyl acetate (VA), acrylic esters (Ac) and acrylamides (Acam), as marketed, for example, by Air Products Polymers, Burghausen, Germany as dispersions, prove to be a suitable adhesive composition for this application.

In one preferred embodiment, the self-adhesive composition has the following makeup:

| | |
|---|---|
| ethylene | from 10 to 30, with particular preference from 10 to 15% by weight |
| vinyl acetate | from 20 to 55, with particular preference from 30 to 35% by weight |
| acrylic ester | from 30 to 69, with particular preference from 50 to 60% by weight |
| acrylamide | from 0 to 8, with particular preference 0.5% by weight. |

The self-adhesive composition may be applied to the backing in dissolved or dispersion form, so that thermal drying results in an adhesive film having a thickness of preferably from 15 to 40 μm.

Depending on the affinity of the adhesive composition for the underside of the backing, a primer may be chosen to ensure secure anchoring of the composition.

With further advantage, a release coating may be present on the reverse of the backing material for the purpose of easy unrollability, and specifically is present when the composition adheres well to the reverse. The release coating is particularly advisable if the material is to be wound into a roll without a separating medium. At the same time, it must ensure secure surfacer and paint adhesion.

The advantages of the adhesive tape of the invention are manifested in particular when it is used in automotive construction. In the text below, this application is described in detail, though is selected only by way of an example of similar applications.

Following the body electrocoating process, in which the cathodic electrocoat is applied to the primed body shell, and following the baking of the cathodic electrocoat, in which the reactive fresh cathodic electrocoat is crosslinked by heat exposure, the adhesive tape with the polyester film coated with a crosslinked thermally vulcanizable polyurethane as backing material, is bonded to the window flange in a width of preferably from 10 to 25 mm.

In the course of this application, the tape must be stretched around the curves, so that no spray mist from the subsequent coating steps is able to pass below any folds. The tape remains on the body until all of the coating steps have been completed. During the coating, the vulcanization of the polyurethane coat starts and leads to a considerable gain in strength of the adhesive tape. After the body has been cooled, the tape can then be removed, together with the paint coats adhering to it, without tearing, delamination and leaving residues of adhesive tape.

The cathodic electrocoat track that remains after demasking offers a secure adhesion substrate for the bonding of automobile windows with the aid of watersensitive, polyurethane-based reactive adhesives.

The adhesive tape of the invention is described below in a preferred embodiment with reference to a number of examples, without thereby wishing to restrict the invention in any way. Moreover, comparative examples are given, in which unsuitable adhesive tapes are depicted.

The following test methods were used to briefly characterize the samples produced in accordance with the described process:

The bond strength was determined in accordance with BDF JOPMA002.

According to this method, the adhesive tape specimen for testing was applied to the adhesion substrate (steel) and then peeled off under defined conditions in a tensile testing machine. The peel angle was 180° in each case, the peel rate 300 mm/min. The force required for peeling is the bond strength.

The tensile strength and elongation at break were determined in the tensile test according to BDF JOPMC001.

In this case, a test strip 100 mm long and 25 mm wide was stretched in the longitudinal direction in a tensile testing machine at a defined clamp speed (300 mm/min) until it tore. The tensile strength, based on the measurement for the width of the sample, and the elongation for the tear force were determined.

Coating in the examples was carried out on an installation from the company Pagendarm. The web width was 50 cm. The width of the coating gap was variably adjustable between 0 and 1 cm. The length of the heating tunnel was approximately 12 m. The temperature in the heating tunnel was divisible into four zones and in each case selectable freely between room temperature and 120° C.

A two-component mixing and metering unit from the company Spritztechnik-EMC was used. The mixing system was dynamic. The mixing head was designed for two liquid components. The mixing rotor had a variable speed with a maximum of approximately 5000 rpm. The metering pumps of this unit were toothed gear pumps having a maximum output of approximately 2 l/min.

The A components were prepared in an evacuable dissolver from Molteni.

The raw materials used in the Examples which follow are identified as follows:

| Name | Producer | chemical name | CAS-number |
| --- | --- | --- | --- |
| POLY BD R45HT ® | Elf Atochem | Hydroxy-terminated Polybutadiene | 69102-90-5 |
| SCHWEFEL CRYSTEX N ® | Kali-Chemie Akzo | Sulfur, milled | 7704-34-9 |
| PERKACIT MBTS ® | Flexsys | 2,2-Dithiobis(benzothiazol)e | 120-78-5 |
| PERKACIT ZBEC ® | Flexsys | Zinkdibenzyldithiocarbamate | 14726-36-4 |
| PERKACIT TBzTD ® | Flexsys | Tetrabenzylthiuramdisulfide | 10591-85-2 |
| WEIBFEINKALK ® | RWK Kalk Aktiengesellschaft | Calcium oxide, milled | 1305-78-8 |
| VESTANAT IPDI ® | Degussa-Hüls | Isophorondiisocyanate | 4098-71-9 |
| BAYFERROX 3920 ® | Bayer | Yellow pigment, FeOH | 20344-49-4 |
| OMYACARB 4BG ® | Omya | milled natural Calcium carbonate | 1317-65-3 |

EXAMPLES

EXAMPLE 1

In a customary coating process, a 23 µm thick polyester (polyethylene terephthalate) film was coated with an application thickness of approximately 25 µm from a solution with a known pressure-sensitive adhesive composition based on natural rubber and comprising

| | |
| --- | --- |
| 48% | natural rubber CV50 |
| 23% | poly-beta-pinene resin |
| 5% | terpene-phenolic resin |
| 3% | rosin |
| 7% | acrylonitrile-butadiene copolymer |
| 8% | zinc oxide |
| 5% | reactive alkylphenol resin and |
| 1% | 2,5-di(tertiary-amyl)hydroquinone | and on winding was lined with a standard commercial release paper.

The polyester film provided with the pressure-sensitive adhesive composition was coated from the nonadhesive side with a degassed, two-component, thermally vulcanizable polyurethane composition at a rate of 1 m/min. The application thickness was 120 µm. Crosslinking took place at a tunnel temperature of 80° C. At this temperature, the vulcanization had not yet started.

The thermally vulcanizable polyurethane composition was made up as follows:

| | Raw material | Weight fraction [% by wt.] |
| --- | --- | --- |
| A component | POLY BID R 45 HT ® | 66.2 |
| | SULFER CRYSTEX N ® | 17.5 |
| | PERKACIT MBTS ® | 3.3 |
| | PERKACIT ZBEC ® | 0.6 |
| | PERKACIT TBzTD ® | 0.6 |
| | Calcium oxide | 5.5 |
| B component | VESTANAT IPDI ® | 6.3 |

The resulting adhesive tape, before thermal vulcanization, had a tensile strength of 53.8 N/cm with an elongation at break of 55.4%. After thermal vulcanization (30 min at 160°) the tensile strength was 29.3 N/cm with an elongation at break of 66.8%. The bond strength on steel was 3.8 N/cm.

A metal test panel was coated electrophoretically with the cathodic electrocoat CATHOGUARD 400 from BASF and baked at 175° C. for 20 minutes. The adhesive tape was bonded to the test panels without bubbles in a width of 20 mm and a length of 30 cm in the shape of an S curve, and pressed on firmly. The fold-free bonding on the curves required a high level of force to be exerted in order to stretch the film. Subsequently, in accordance with hard practical conditions, the bonded panel was coated with a surfacer, which was baked at 180° C. for 30 minutes. After cooling, a solventborne basecoat film was applied, which was flashed off at room temperature for 5 minutes and then covered with a 2-component clearcoat. The panel was subsequently dried in an oven at 130° C for 30 minutes.

Visual assessment after cooling showed the tape to be unchanged in position relative to the original position. Subsequently, the tape was removed at various peel angles between 45° and 180°. It was possible to remove the adhesive tape from the cathodically electrocoated panel without problems, with no tearing or delamination. A clean, paint-free track remained on the cathodic electrocoat substrate. The paint remained adhering fully to the reverse of the tape.

EXAMPLE 2

In a customary coating process, a 23 µm thick polyester (polyethylene terephthalate) film was coated with an application thickness of approximately 25 µm from a solution with the natural-rubber-based pressure-sensitive adhesive composition specified in Example 1 and on winding was lined with a standard commercial release paper.

The polyester film provided with the pressure-sensitive adhesive composition was coated from the nonadhesive side with a degassed, two-component, thermally vulcanizable polyurethane composition at a rate of 1 m/min. The application thickness was 120 μm. Crosslinking took place at a tunnel temperature of 80° C. At this temperature the vulcanization had not yet started.

The thermally vulcanizable polyurethane composition was made up as follows:

|   | Raw material | Weight fraction [% by wt.] |
|---|---|---|
| A component | POLY BID R 45 HT ® | 46.0 |
|   | SULFER CRYSTEX N ® | 12.2 |
|   | PERKACIT MBTS ® | 2.3 |
|   | PERKACIT ZBEC ® | 0.4 |
|   | PERKACIT TBzTD ® | 0.4 |
|   | Calcium oxide | 5.0 |
|   | BEYFERROX 3920 ® | 1.0 |
|   | OMYACARB 4BG ® | 28.3 |
| B component | VESTANAT IPDI ® | 4.4 |

The resulting adhesive tape, before thermal vulcanization, had a tensile strength of 64.0 N/cm with an elongation at break of 62.4%. After thermal vulcanization (30 min at 160° C.) the tensile strength was 93.1 N/cm with an elongation at break of 61.1%. The bond strength on steel was 3.5 N/cm.

A metal test panel was coated electrophoretically with the cathodic electrocoat CATHOGUARD 400 from BASF and baked at 175° C. for 20 minutes. The adhesive tape was bonded to the test panels without bubbles in a width of 20 mm and a length of 30 cm in the shape of an S curve, and pressed on firmly. The fold-free bonding on the curves required a high level of force to be exerted in order to stretch the film. Subsequently, in accordance with hard practical conditions, the bonded panel was coated with a surfacer, which was baked at 180° C. for 30 minutes. After cooling, a solventborne basecoat film was applied, which was flashed off at room temperature for 5 minutes and then covered with a 2-component clearcoat. The panel was subsequently dried in an oven at 130° C. for 30 minutes.

Visual assessment after cooling showed the tape to be unchanged in position relative to the original position. Subsequently, the tape was removed at various peel angles between 45° and 180°. It was possible to remove the adhesive tape from the cathodically electrocoated panel without problems, with no tearing or delamination. A clean, paint-free track remained on the cathodic electrocoat substrate. The paint remained adhering fully to the reverse of the tape.

EXAMPLE 3

A 23 μm thick polyester (polyethylene terephthalate) film was coated with a degassed, two-component, thermally vulcanizable polyurethane composition at a rate of 1 m/min and on winding was lined with a standard commercial release paper.

The application thickness was 120 μm. Crosslinking took place at a tunnel temperature of 80° C. At this temperature the vulcanization had not yet started.

The thermally vulcanizable polyurethane composition was made up as follows:

|   | Raw material | Weight fraction [% by wt.] |
|---|---|---|
| A component | POLY BD R 45 HT ® | 46.0 |
|   | SULFER CRYSTEX N ® | 12.2 |
|   | PERKACIT MBTS ® | 2.3 |
|   | PERKACIT ZBEC ® | 0.4 |
|   | PERKACIT TBzTD ® | 0.4 |
|   | Calcium oxide | 5.0 |
|   | BEYFERROX 3920 ® | 1.0 |
|   | OMYACARB 4BG ® | 28.3 |
| B component | VESTANAT IPDI ® | 4.4 |

Subsequently, the polyester film provided with the polyurethane composition was coated in a customary process with an application thickness of approximately 25 μm from a solution with the natural-rubber-based pressure-sensitive adhesive composition specified in Example 1.

The resulting adhesive tape had, before thermal vulcanization, a tensile strength of 53.7 N/cm with an elongation at break of 57.1%. After thermal vulcanization (30 min at 160° C.) the tensile strength was 86.6 N/cm with an elongation at break of 61.7%. The bond strength on steel was 2.9 N/cm.

A metal test panel was coated eleotrophoretically with the cathodic electrocoat CATHOGUARD 400 from BASF and baked at 175° C. for 20 minutes. The adhesive tape was bonded to the test panels without bubbles in a width of 20 mm and a length of 30 cm in the shape of an S curie, and pressed on firmly. The fold-free bonding on the curves required a high level of force to be exerted in order to stretch the film. Subsequently, in accordance with hard practical conditions, the bonded panel was coated with a surfacer, which was baked at 180° C. for 30 minutes. After cooling, a solventborne basecoat film was applied, which was flashed off at room temperature for 5 minutes and Then covered with a 2-component clearcoat. The panel was subsequently dried in an oven at 130° C. for 30 minutes.

Visual assessment after cooling showed the tape to be unchanged in position relative to the original position. Subsequently, the tape was removed at various peel angles between 45° and 180°. It was possible to remove the adhesive tape from the cathodically electrocoated panel without problems, with no tearing or delamination. A clean, paint-free track remained on the cathodic electrocoat substrate. The paint remained adhering fully to the reverse of the tape.

EXAMPLE 4

In a customary coating process, a 23 μm thick polyester (polyethylene terephthalate) film was coated with an application thickness of approximately 25 μm with a solvent-based acrylate pressure-sensitive adhesive composition, comprising butyl acrylate (47.5%), ethylhexyl acrylate (47.5%), glycidyl methacrylate (2%), acrylic acid (3%) and small amounts of a known crosslinker, and on winding was lined with a standard commercial release paper.

The polyester film provided with the pressure-sensitive adhesive composition was coated from the nonadhesive side with a degassed, two-component, thermally vulcanizable polyurethane composition at a rate of 1 m/min. The application thickness was 120 μm. Crosslinking took place at a tunnel temperature of 80° C. At this temperature the vulcanization had not yet started.

The thermally vulcanizable polyurethane composition was made up as follows:

|  | Raw material | Weight fraction [% by wt.] |
|---|---|---|
| A component | POLY BD R 45 HT ® | 46.0 |
|  | SULFER CRYSTEX N ® | 12.2 |
|  | PERKACIT MBTS ® | 2.3 |
|  | PERKACIT ZBEC ® | 0.4 |
|  | PERKACIT TBzTD ® | 0.4 |
|  | Calcium oxide | 5.0 |
|  | BEYFERROX 3920 ® | 1.0 |
|  | OMYACARB 4BG ® | 28.3 |
| B component | VESTANAT IPDI ® | 4.4 |

The resulting adhesive tape, before Thermal vulcanization, had a tensile strength of 63.6 N/cm with an elongation at break of 51.4%. After thermal vulcanization (30 mm at 160°) the tensile strength was 85.9 N/cm with an elongation at break of 78.4%. The bond strength on steel was 3.1 N/cm.

A metal test panel was coated electrophoretically with the cathodic electrocoat CATHOGUARD 400 from BASF and baked at 175° C. for 20 minutes. The adhesive tape was bonded to the test panels without bubbles in a width of 20 mm and a length of 30 cm in the shape of an S curve, and pressed on firmly. The fold-free bonding on the curves required a high level of force to be exerted in order to stretch the film. Subsequently, in accordance with hard practical conditions, the bonded panel was coated with a surfacer, which was baked at 180° C for 30 minutes. After cooling, a solventborne basecoat film was applied, which was flashed off at room temperature for 5 minutes and then covered with a 2-component clearcoat. The panel was subsequently dried in an oven at 130° for 30 minutes.

Visual assessment after cooling showed the tape to be unchanged in position relative to the original position. Subsequently, the tape was removed at various peel angles between 45° and 180°. It was possible to remove the adhesive tape from the cathodically electrocoated panel without problems, with no tearing or delamination. A clean, paint-free track remained on the cathodic electrocoat substrate. The paint remained adhering fully to the reverse of the tape.

EXAMPLE 5

In a customary coating process, a 23 µm thick polyester (polyethylene terephthalate) film was coated with an application thickness of approximately 25 µm with VINNAPAS EAF 60 (Air Products Polymers, Burghausen, Germany), and on winding was lined with a standard commercial release paper.

The polyester film provided with the pressure-sensitive adhesive composition was processed further as in Example 4. The resulting adhesive tape, before thermal vulcanization, had a tensile strength of 78.3 N/cm with an elongation at break of 55.3%. After thermal vulcanization (30 min at 160° C.) the tensile strength was 96.1 N/cm with an elongation at break of 63.1%. The bond strength on steel was 2.5 N/cm.

A metal test panel was coated electrophoretically with the cathodic electrocoat CATHOGUARD 400 from BASF and baked at 175° C. for 20 minutes. The adhesive tape was bonded to the test panels without bubbles in a width of 20 mm and a length of 30 cm in the shape of an S curve, and pressed on firmly. The fold-free bonding on the curves required a high level of force to be exerted in order to stretch the film. Subsequently, in accordance with hard practical conditions, the bonded panel was coated with a surfacer, which was baked at 180° C. for 30 minutes. After cooling, a solventborne basecoat film was applied, which was flashed off at room temperature for 5 minutes and then covered with a 2-component clearcoat. The panel was subsequently dried in an oven at 130° C. for 30 minutes.

Visual assessment after cooling showed the tape to be unchanged in position relative to the original position. Subsequently, the tape was removed at various peel angles between 45° and 180°. It was possible to remove the adhesive tape from the cathodically electrocoated panel without problems, with no tearing or delamination. A clean, paint-free track remained on the cathodic electrocoat substrate. The paint remained adhering fully to the reverse of the tape.

COMPARATIVE EXAMPLE 6

A 25 µm thick PET film web was primed with a solution of 2 parts of natural rubber in toluene, mixed beforehand with 1 part of diphenylmethane diisocyanate, and after drying was coated from solution with the natural-rubber-based pressure-sensitive adhesive composition specified in Example 1, with an application thickness of about 25 µm.

The resulting adhesive tape had a tensile strength of 47.2 N/cm with an elongation at break of 74.0%. The bond strength on steel was 3.8 N/cm.

A metal test panel was coated electrophoretically with the cathodic electrocoat CATHOGUARD 400 from BASE and baked at 175° C. for 20 minutes. The adhesive tape was bonded to the test panels without bubbles in a width of 20 mm and a length of 30 cm in the shape of an S curve, and pressed on firmly. The fold-free bonding on the curves required a high level of force to be exerted in order to stretch the film. Subsequently, in accordance with hard practical conditions, the bonded panel was coated with a surfacer, which was baked at 180° for 30 minutes. After cooling, a solventborne basecoat film was applied, which was flashed off at room temperature for 5 minutes and then covered with a 2-component clearcoat. The panel was subsequently dried in an oven at 130° for 30 minutes.

Visual assessment after cooling showed the tape to be unchanged in position relative to the original position. Subsequently, the tape was removed at various peel angles between 45° and 180°. On removal, the adhesive tape tore in several places, starting from the edge. During removal, the paint partly flaked from the reverse of the tape.

COMPARATIVE EXAMPLE 7

A 25 µm thick PET film web was primed on both sides with a solution of 2 parts of natural rubber in toluene, mixed beforehand with 1 part of diphenylmethane diisocyanate.

A flexible PVC film of 90 µm in thickness which had been primed beforehand with a nitrile rubber/natural rubber solution was coated with a solution of a natural rubber adhesive composition in petroleum spirit, having a solids content of 30 percent by weight. This consisted of 50 parts of natural rubber, 10 parts of zinc oxide, 3 parts of rosin, 6 parts of alkylphenol resin, 17 parts of terpene-phenolic resin, 12 parts of poly-β-pinene resin and 2 parts of gold oil. The coat thickness was chosen so that drying with heat gave an adhesive film with a thickness of 30 µm.

Immediately after the drying, before the film web was wound up, the primed PET film was introduced and rolled on firmly, without creases, under high pressure between two laminating rolls. When the two films were pulled apart in a tensile testing machine at an angle of 90° and a rate of 300 mm/min, the delamination resistance was found to be 6.2 N/cm.

The already primed PET underside of the laminate was coated from solution with the natural-rubber-based pressure-sensitive adhesive composition specified in Example 1, with an application thickness of about 25 µm.

The resulting adhesive tape had a tensile strength of 71.2 N/cm with an elongation at break of 131.1%. The bond strength on steel was 3.8 N/cm.

A metal test panel was coated electrophoreticany with the cathodic electrocoat CATHOCUARD 400 from BASF and baked at 175° C. for 20 minutes. The adhesive tape was bonded to the test panels without bubbles in a width of 20 mm and a length of 30 cm in the shape of an S curve, and pressed on firmly. The fold-free bonding on the curves accordance with hard practical conditions, the bonded panel was coated with a surfacer, required a high level of force to be exerted in order to stretch the film. Subsequently, in which was baked at 180° C for 30 minutes. After cooling, a solventborne basecoat film was applied, which was flashed off at room temperature for 5 minutes and then covered with a 2-component clearcoat. The panel was subsequently dried in an oven at 130 ° C for 30 minutes.

Visual assessment after cooling showed the tape to be unchanged in position relative to the original position. Subsequently, the tape was removed at various peel angles between 45° and 180°. On removal, the adhesive tape delaminated from the cathodically electrocoated panel after a few centimeters, for no apparent reason. In one case, a small section of polyester film remained on the panel, without complete delamination. The paint remained adhering fully to the reverse of the tape.

What is claimed is:

1. An adhesive tape provided on one side with a self-adhesive composition and comprising a backing material comprising a polyester film coated with a crosslinked, thermally vulcanizable polyurethane.

2. The adhesive tape as claimed in claim 1, wherein the crosslinked thermally vulcanizable polyurethane comprises fillers, plasticizers and, optionally, auxiliaries and additives as further formulating constituents.

3. The adhesive tape as claimed in claim 1, wherein an NCO/OH ratio of from 0.8 to 1.2 is set for the formation of the crosslinked, thermally vulcanizable polyurethane.

4. The adhesive tape according to claim 1, wherein the polyol component of polyurethane contains carbon—carbon double bonds.

5. The adhesive tape according to claim 1, wherein said vulcanizable polyurethane comprises sulfur, as vulcanizing agent.

6. The adhesive tape according to claim 1, wherein said vulcanizable polyurethane comprises one or more members of the group consisting of thiazoles, sulfenamides, thiurams, guanidines, dithiocarbamates, thioureas and zinc oxide as vulcanization accelerators.

7. The adhesive tape according to claim 1, wherein the polyurethane coating is coated with a release coating.

8. The adhesive tape according to claim 1, wherein the self-adhesive composition has the following makeup:

| | |
|---|---|
| ethylene | from 10 to 30% by weight |
| vinyl acetate | from 20 to 55% by weight |
| acrylic ester | from 30 to 69% by weight |
| acrylamide | from 0 to 8% by weight. |

9. The adhesive tape of claim 8, wherein the amount of ethylene is 10–15% by weight, the amount of vinyl acetate is 30 to 35% by weight, he amount of acrylic ester is 50 to 60% by weight, and the amount of acrylamide is 0.5% by weight.

10. The adhesive tape according to claim 1, wherein the self-adhesive composition has a thickness of from 15 to 40 µm.

11. A method for masking window flanges which comprises applying the adhesive tape of claim 1 to said flanges.

12. A process for producing the adhesive tape of claim 1, which comprises applying a mixture of starting components of said thermally vulcanizaable polyurethane during their chemical reaction phase, directory on the polyester film.

13. The process of claim 12, wherein the polyester film is provided with the self-adhesive composition prior to coating with the thermally vulcanizable polyurethane opposite the side to be coated with polyurethane.

* * * * *

UNITED STATES PATENT AND TRADEMARK OFFICE
CERTIFICATE OF CORRECTION

PATENT NO. : 6,599,624 B2
DATED : July 29, 2003
INVENTOR(S) : Schumann et al.

It is certified that error appears in the above-identified patent and that said Letters Patent is hereby corrected as shown below:

Column 14,
Line 29, "he amount" should read -- the amount --

Signed and Sealed this

First Day of February, 2005

JON W. DUDAS
*Director of the United States Patent and Trademark Office*